Nov. 1, 1932. H. J. YOUNT. Re. 18,644

METHOD OF REPAIRING ENGINE CYLINDERS

Original Filed Nov. 6, 1929

Inventor.
HORACE J. YOUNT. DECEASED.
BY EAGLE MACHINE COMPANY, INC.
ASSIGNEE HORACE J. YOUNT. DECEASED.
BY CHARLES W. YOUNT. PRESIDENT.
By Minturn & Minturn,
Attorneys.

Reissued Nov. 1, 1932

Re. 18,644

UNITED STATES PATENT OFFICE

HORACE J. YOUNT, DECEASED, LATE OF INDIANAPOLIS, INDIANA, BY EAGLE MACHINE COMPANY, INCORPORATED, OF INDIANAPOLIS, INDIANA, ASSIGNEE

METHOD OF REPAIRING ENGINE CYLINDERS

Original No. 1,842,441, dated January 26, 1932, Serial No. 405,069, filed November 6, 1929. Application for reissue filed March 21, 1932. Serial No. 600,351.

It frequently happens that the cylinders of internal combustion engines become worn, scored or cracked in use, heretofore requiring a replacement of the cylinder and as there are commonly a plurality of cylinders in a unitary casting of such engines, making a replacement of all of them necessary, the resulting expense is high.

The object of this invention is to repair worn, scored and cracked cylinders by boring them larger and inserting a cast metal lining or shell having cored-out parts to register and correspond with those of the cylinder.

A further object is to improve the details of such repair whereby standard shells may be kept in stock for prompt use and whereby the installation may be accurately as well as quickly made.

I accomplish the above, and other objects which will hereinafter appear, by the means illustrated in the accompanying drawing, in which—

Like characters of reference indicate like parts in the several views of the drawing.

Figure 2:
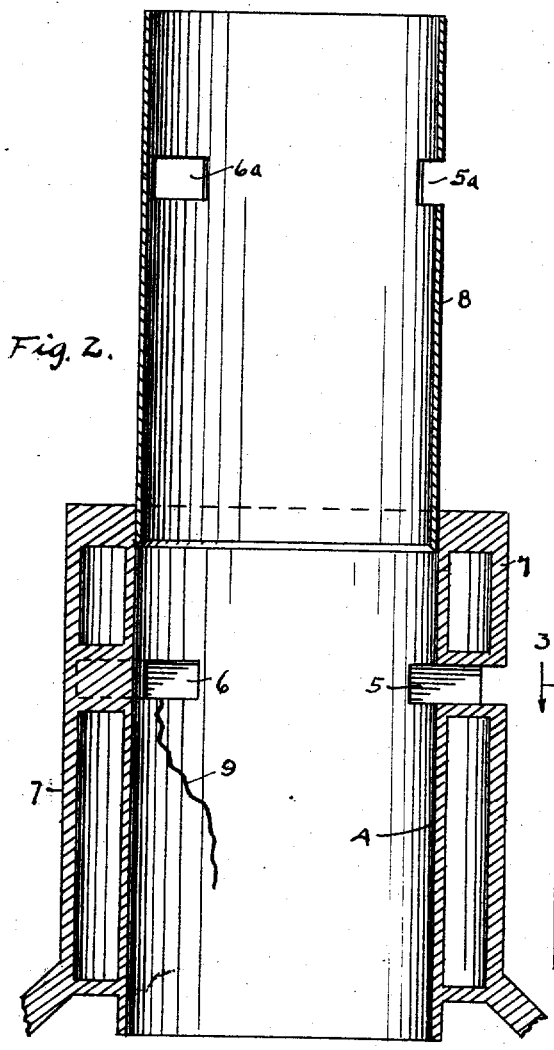
Fig. 2 is a longitudinal section on the line 2—2 of Fig. 1.
Figure 1:
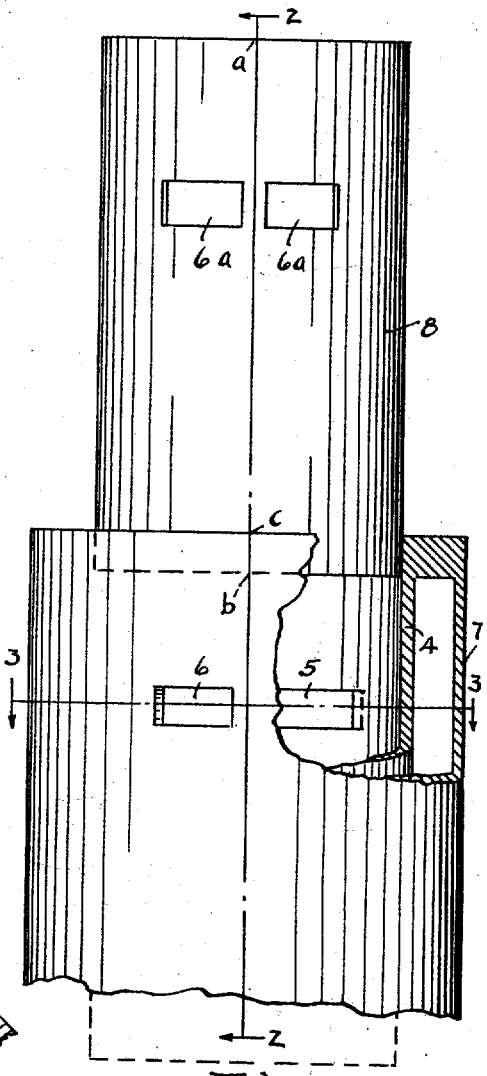
Fig. 1 is a view in side elevation and partial vertical section, of a cylinder in which the introduction of a repair shell is just begun.
Figure 3:
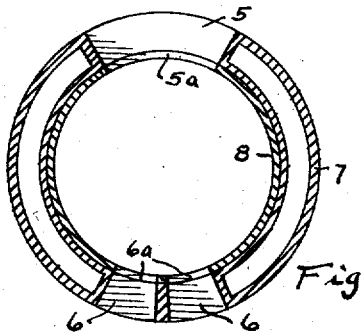
Fig. 3 is a transverse section on the line 3—3 of Fig. 1 on a reduced scale.

A cylinder 4, may be of any usual and suitable construction, the type here shown having a single port 5, through one side of its wall and a pair of ports 6, 6, through the wall diametrically opposite; but that will vary in different engine types. The cylinder is surrounded by the usual water-jacket 7.

A crack wear or score in the cylinder, here shown at 9, is to be closed by the aid of my invention, which comprises the reboring of the cylinder 4, to a diameter sufficiently enlarged to receive a metal lining or shell 8.

The shell 8 is preferably formed of cast iron which is initially thicker in both outside and inside diameters for machining to the exact dimensions which are required for use. The shell has port holes 5*a* and 6*a*, 6*a*, corresponding in all respects as to size, shape, and location, with the respective ports 5 and 6, 6, of the cylinder. Thus, when the shell is assembled in the cylinder the several port openings will exactly register.

The cast shells 8 are turned down on the outside, preferably to a standard diameter, in order that they may be made in quantities and kept in stock for quick delivery as needed, and the exact outside measurement known in advance by the mechanic ordering it, thereby enabling him to proceed with the reboring of the cylinder while the shell for this particular type and size of engine is in transit from a supply house.

The cylinder is rebored to a diameter which will receive the shell with a tight sliding fit, under pressure, in order to hold the assembly without other fastening means. The inner edge of the shell farthest from the ports is chamfered to receive the piston (not shown) with the greatest freedom, and a longitudinal line *a*—*b* is scored into the outside finished surface of the shell.

The end of the cylinder is formed with an indent *c*, located by careful measurement, to indicate, by placing the line *a*—*b* opposite it, where the shell must be positioned at the beginning of its installation, and the line and indent are kept together until the installation is complete, to insure the proper registration of the ports of the shell with those of the cylinder.

The length of the shell is just right to bring the ports into proper register when the outer end of the shell has moved until it is flush with the end of the cylinder.

After the shell is finally positioned in the cylinder, the inside diameter of the shell is formed by grinding or other suitable means to fit the piston that is to be used with that job. To enable this to be done the inside diameter is left purposely smaller than it will be in the finished product.

I claim:

1. The method of repairing a worn gas engine cylinder which comprises cutting the cylinder to a uniform diameter greater than its initial standard diameter, forming a tubular sleeve with an initial external diameter exceeding that of the greatest diameter to which said cylinder may safely be cut and with an internal diameter less than the standard diameter of the cylinder, cutting the sleeve externally to reduce its diameter to near that of the enlarged cylinder to provide for a force fit, pressing the sleeve into the enlarged cylinder, and cutting the sleeve internally to a standard diameter for the cylinder.

2. The method of repairing a worn gas engine cylinder which comprises forming a tubular sleeve to have a finished external predetermined diameter exceeding that of the original standard internal diameter of said cylinder and to have an internal diameter less than the standard internal diameter of the cylinder, forming the cylinder to a uniform diameter a little less than the said predetermined diameter of the sleeve to provide for a force-fit of the sleeve within the cylinder, pressing the sleeve into the cylinder, and forming the sleeve internally to a finished diameter required for the piston to be used therein.

EAGLE MACHINE COMPANY, INCORPORATED,
*Assignee of Horace J. Yount, Deceased,*
By CHARLES W. YOUNT,
*President.*